United States Patent Office 3,140,323
Patented July 7, 1964

3,140,323
PROCESS FOR PRODUCTION OF ACETYLENE AND OTHER PRODUCTS BY PARTIAL COMBUSTION OF HYDROCARBONS
Giacomo Fauser, Novara, Italy, assignor to Montecatini Società Generale per l'Industria Mineraria e Chimica, Milan, Italy
No Drawing. Filed May 19, 1959, Ser. No. 814,146
Claims priority, application Italy May 21, 1958
7 Claims. (Cl. 260—679)

The production of acetylene from hydrocarbons is accomplished industrially by incomplete combustion of hydrocarbons with oxygen in suitable furnaces at a temperature of approximately 1500° C., with successive cooling of the reaction products as soon as possible, i.e., abruptly, to avoid dissociation of the acetylene. Such cooling has up to the present time been carried out by extinction of the flame with injected cold water. Since this operation is performed at a pressure very close to atmospheric, all the combustion heat is eliminated by such water cooling, and is therefore simply lost.

The outlet gases from the furnace contain only 8 to 10% of acetylene, the remainder of the outlet gases being preponderantly hydrogen and carbon monoxide, which is used as raw material for heavy industrial syntheses.

To carry out the process economically it is of the highest importance to not only obtain maximum production of acetylene, but also of the yield of by-product gases utilizable industrially.

The present invention relates to a new and simply executed process of great efficiency directed toward increasing the gas yield by a rational utilization of the heat evolved during the partial oxidation of the hydrocarbon.

The process involves carrying out the cooling of the outlet gases from the incomplete combustion by use of mineral oils instead of water. This process may be applied to any type of furnace intended to be used for the production of acetylene from liquid and gaseous hydrocarbons. The mineral oil is atomized into or in the direction of the flame in the form of very thin sprays, in order to obtain a fog composed of the finest drops, which undergo a partial cracking. By employing a convenient mass flow of mineral oil, there is achieved a great increase in the yields of acetylene, ethylene and synthesis gas, with very important economic results.

Since higher cracking temperatures increase the yields of valuable products, it is advantageous to carry out the cooling of the outlet gases from the incomplete combustion in two distinct steps. Into exit gases, in a region successive to that in which the reaction takes place, with formation of the acetylene, the mineral oil is sprayed in a quantity sufficient to lower the temperature of the gas down to 700–800° C. The said exit gases are at a temperature at least sufficiently high to result in a partial cracking of said oil. The preheating of the oil up to the maximum tolerable temperature favors cracking with an advantageous increase in yields of acetylene and ethylene. Into the nearest successive part of the reaction space oil is sprayed in a quantity necessary to cool the exit gases down to 200° C. In order to avoid the decomposition of the acetylene, the time interval between the first and the second cooling must be reduced to a few hundredths parts of a second, viz. about three-hundredths of a second.

The increase in yield of acetylene and ethylene depends upon numerous factors; for instance, upon the properties of the mineral oils used in the first and the second cooling stages, and upon the superheating temperature, namely the temperature of preheating of the oil. The increase in production of synthesis gas can exceed 50% normally obtained where the cooling is carried out with water.

The invention process is also useful in the conversion of heavy liquid hydrocarbons, such as petroleum distillation residues, into valuable light fractions. The process is economical because it requires no additional consumption of other combustible gas and oxygen, which are two major elements entering into cost of production.

Another advantage of the new process is that, by cooling the gases, derived from the partial combustion, down to 200° C. by use of an oil having a boiling point above 250° C., it is made feasible to use the hot oil for the regeneration of the selective solvents generally used for separation of acetylene from the residue gases. It is thus possible to realize a considerable saving of steam, in comparison with processes in which the cooling is carried out with cold water.

Operation at pressures of a number of atmospheres permits the use of an oil having a boiling range under 250° C.

I claim:
1. A process for making acetylene comprising subjecting a hydrocarbon to incomplete combustion with oxygen, cooling the hot reaction gases containing acetylene to minimize dissociation of the acetylene, said cooling being carried out by contacting a hydrocarbon oil with the said hot gases, the latter being at a temperature at least sufficiently high to result in partial cracking of said oil, the hydrocarbon being a mineral oil having a boiling point above 250° C., the quantity of oil being initially adjusted to lower the temperature of the gases down to within the range of 700° to 800° C., an additional quantity of said oil being introduced into the exit gases so produced to lower the temperature down to a temperature not higher than about 200° C., the time interval between the first and second cooling stages being not more than a few hundredths of a second.

2. A process comprising subjecting a hydrocarbon to incomplete combustion with oxygen at about 1500° C., in a reaction zone, to produce hydrogen, carbon monoxide, and acetylene, abruptly cooling the exit gases from the reaction zone to minimize dissociation of the acetylene, said cooling being carried out by atomizing a hydrocarbon oil to form a fog of fine drops of oil, which are carried along in the current of exit gases, the mineral oil being at least partially cracked to yield at least one of the following products: acetylene and ethylene, the quantity of oil employed being that required to lower the temperature to the range between about 700° to 800° C., and substantially immediately thereafter introducing more hydrocarbon oil having a boiling point above 250° C. into the exit gases so produced to lower the temperature down to a temperature not higher than about 200° C.

3. A process for making acetylene comprising subjecting a hydrocarbon to incomplete combustion with oxygen, cooling the hot reaction gases containing acetylene to minimize dissociation of the acetylene, said cooling being carried out by contacting an atomized hydrocarbon oil with the said hot gases, the oil drops being carried along in said hot gases, the oil having a boiling point above 250° C. and being preheated to favor its cracking by said hot gases, the hot gases being at a temperature at least sufficiently high to result in partial cracking of said oil, the quantity of oil being adjusted to lower the temperature of the gases down to within the range of about 700° to 800° C., and substantially immediately thereafter introducing an additional quantity of said hydrocarbon oil into the exit gases so produced, to lower the temperature down to a temperature not higher than about 200° C.

4. The process of claim 3, the time interval between the first and second introductions of the oil being about three-hundredths of a second.

5. A process for making acetylene comprising subjecting a hydrocarbon to incomplete combustion with oxygen, cooling the hot reaction gases containing acetylene to minimize dissociation of the acetylene, said cooling being carried out by contacting a hydrocarbon oil with the said hot gases, the latter being at a temperature at least sufficiently high to result in partial cracking of said oil, the hydrocarbon being a mineral oil having a boiling point above 250° C., the quantity of oil being initially adjusted to lower the temperature of the gases down to within the range of 700° to 800° C., an additional quantity of said oil being introduced into the exit gases so produced to lower the temperature down to a temperature not higher than about 200° C., the time interval between the first and second cooling stages being not more than a few hundredths of a second, the hydrocarbon oil being a heavy liquid hydrocarbon petroleum distillation residue, and being preheated to the maximum tolerable temperature before introduction into the first cooling stage.

6. A process comprising subjecting a hydrocarbon to incomplete combustion with oxygen at about 1500° C., in a reaction zone, to produce hydrogen, carbon monoxide, and acetylene, abruptly cooling the exit gases from the reaction zone to minimize dissociation of the acetylene, said cooling being carried out by atomizing a hydrocarbon oil to form a fog of fine drops of oil, which are carried along in the current of exit gases, the mineral oil being at least partially cracked to yield at least one of the following products: acetylene and ethylene, the quantity of oil employed being that required to lower the temperature to the range between about 700° to 800° C., and substantially immediately thereafter introducing more hydrocarbon oil having a boiling point above 250° C. into the exit gases so produced to lower the temperature down to a temperature not higher than about 200° C., the hydrocarbon oil being a heavy liquid hydrocarbon petroleum distillation residue, and being preheated to the maximum tolerable temperature before introduction into the first cooling stage.

7. The process of claim 6, the time interval between the first and second introductions of the oil being of the order of about three hundredths of a second.

References Cited in the file of this patent
UNITED STATES PATENTS

| | | |
|---|---|---|
| 2,039,981 | Rembert | May 5, 1936 |
| 2,366,521 | Guichet | Jan. 2, 1945 |
| 2,371,147 | Burk | Mar. 13, 1945 |
| 2,439,730 | Happel | Apr. 13, 1948 |
| 2,498,444 | Orr | Feb. 21, 1950 |
| 2,723,300 | Lewis | Nov. 8, 1955 |
| 2,813,138 | MacQueen | Nov. 12, 1957 |
| 2,868,856 | Hale et al. | Jan. 13, 1959 |
| 2,941,021 | Krause et al. | June 14, 1960 |
| 2,945,074 | Elliott et al. | July 12, 1960 |
| 2,985,698 | Pechtold et al. | May 23, 1961 |